(12) United States Patent
Choi

(10) Patent No.: US 7,551,231 B2
(45) Date of Patent: Jun. 23, 2009

(54) DISPLAY APPARATUS AND CONTROL METHOD THEREOF

(75) Inventor: Kyoung-oh Choi, Seoul (KR)

(73) Assignee: Samsung Electronics Co., Ltd, Suwon-si (KR)

(*) Notice: Subject to any disclaimer, the term of this patent is extended or adjusted under 35 U.S.C. 154(b) by 604 days.

(21) Appl. No.: 11/174,572

(22) Filed: Jul. 6, 2005

(65) Prior Publication Data
US 2006/0012716 A1 Jan. 19, 2006

(30) Foreign Application Priority Data
Jul. 16, 2004 (KR) ............... 10-2004-0055607

(51) Int. Cl.
*H04N 7/01* (2006.01)
(52) U.S. Cl. .................................. 348/584
(58) Field of Classification Search ........... 348/588, 348/43, 48, 584, 473, 583
See application file for complete search history.

(56) References Cited

U.S. PATENT DOCUMENTS

| 5,714,997 A * | 2/1998 | Anderson ............... 348/39 |
| 5,798,750 A | 8/1998 | Ozaki |
| 6,104,425 A * | 8/2000 | Kanno ................... 348/43 |
| 6,137,468 A | 10/2000 | Martinez et al. |
| 6,346,972 B1 | 2/2002 | Kim |
| 6,441,844 B1 * | 8/2002 | Tatsuzawa ............... 348/42 |
| 6,697,124 B2 | 2/2004 | Dimitrova et al. |
| 2001/0048481 A1 * | 12/2001 | Hatano et al. ........... 348/473 |
| 2003/0122781 A1 | 7/2003 | Koo |
| 2004/0012724 A1 | 1/2004 | Jang |
| 2004/0190749 A1 * | 9/2004 | Xu et al. ............... 382/100 |

FOREIGN PATENT DOCUMENTS

| KR | 1998-7525 | 3/1998 |
| KR | 1999-51689 | 7/1999 |
| KR | 2000-23136 | 4/2000 |
| WO | WO 96/31843 | 10/1996 |
| WO | WO 98/10407 | 3/1998 |

OTHER PUBLICATIONS

European Search Report dated Feb. 29, 2008 issued in EP 05756754.7.
Chinese Office Action dated Apr. 4, 2008 issued in CN 2005-800312750.

* cited by examiner

*Primary Examiner*—Paulos M Natnael
(74) *Attorney, Agent, or Firm*—Stanzione & Kim, LLP

(57) ABSTRACT

A display apparatus to receive a plurality of video signals from a plurality of different video signal sources, the display apparatus includes a user selection part to select at least one of the plurality of video signals and to select rotation of the video signal and a controller to control the video signal selected through the user selection part to be rotated and displayed. Thus the present general inventive concept provides a display apparatus and a control method thereof, in which video signals are individually rotated, thereby providing an optimum picture to a user and realizing various screen displays.

13 Claims, 10 Drawing Sheets

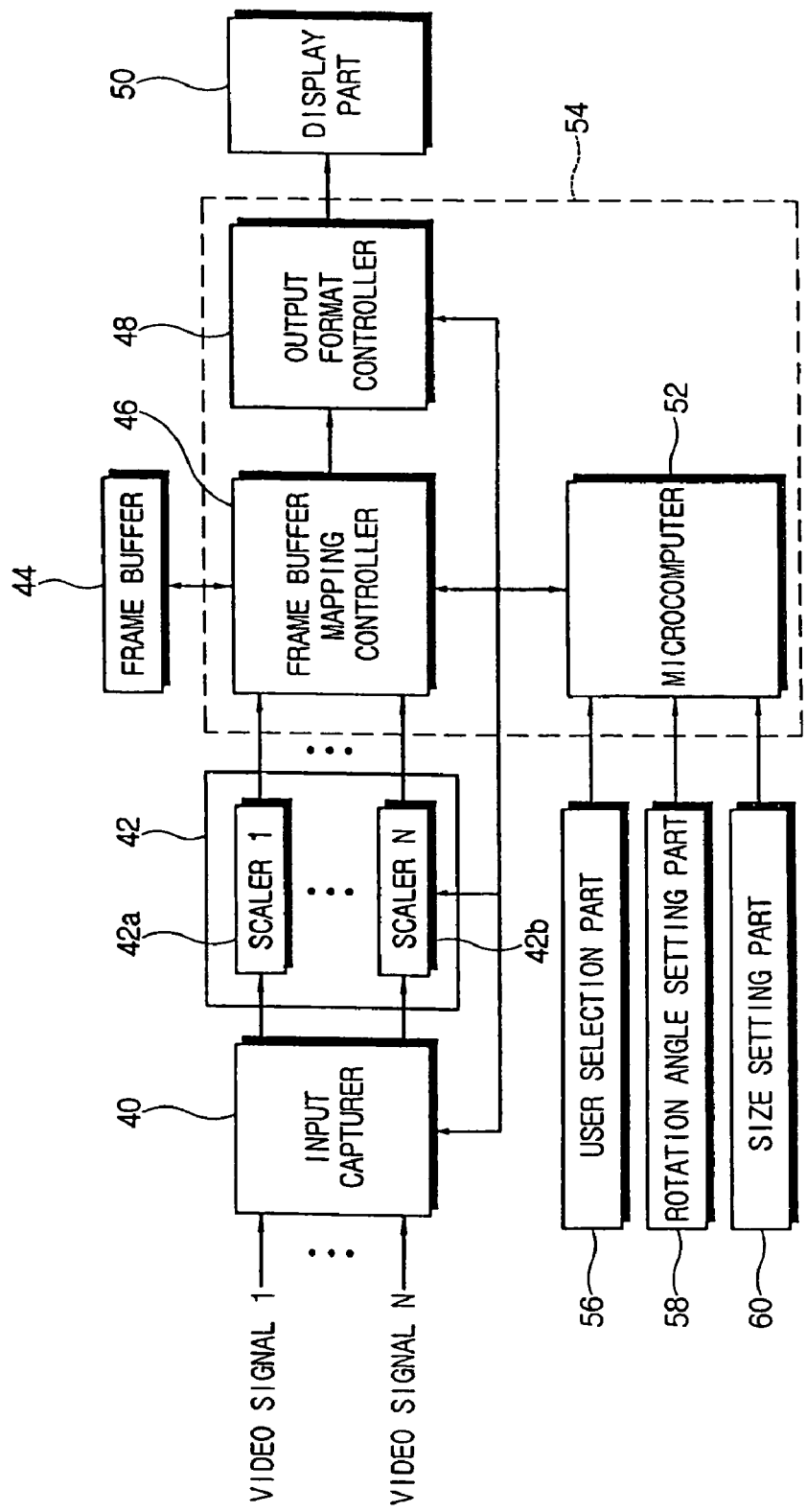

FIG. 4
| SIGNAL SOURCE | ROTATION | ANGLE | SIZE |
|---|---|---|---|
| DVD | Yes | 90° |  |
| ⋮ | ⋮ | | |
| PC | Yes | 180° |  |

DISPLAY APPARATUS AND CONTROL METHOD THEREOF

CROSS-REFERENCE TO RELATED APPLICATIONS

This application claims the benefit under 35 U.S.C. § 119 of Korean Patent Application No. 2004-55607, filed Jul. 16, 2004, in the Korean Intellectual Property Office, the disclosure of which is incorporated herein in its entity by reference.

BACKGROUND OF THE INVENTION

1. Field of the Invention

The present general inventive concept relates to a display apparatus and a control method thereof, and more particularly, to a display apparatus and a control method thereof, in which video signals are individually rotated, thereby providing an optimum picture to a user and realizing various screen displays.

2. Description of the Related Art

A display apparatus is a device processing a video signal transmitted from a video signal source and displaying a picture based on the video signal. Here, the video signal source includes a personal computer (PC), a television, a digital video disk (DVD) player, a video tape recorder (VTR), and the like.

Meanwhile, the display apparatus is provided with additional functions such as a PIP (picture in picture) function allowing one or more secondary pictures to be superimposed over one primary picture while displaying the primary picture, and a PBP (picture by picture) splitting a screen into two portions side by side and displaying one picture by the other picture's side.

For example, a user can select the display apparatus to display a primary picture from the PC and a secondary picture from the television or the VTR, or to display a primary picture from the television or the VTR and a secondary picture from the PC. Thus, different video signals respectively inputted from different video signal sources can be displayed on one screen at once.

Further, there has been recently developed a display apparatus with a pivoting function allowing the display apparatus to be pivoted. In the display apparatus with the pivoting function, the entire picture is rotated as the display apparatus is pivoted, and resized in correspondence to an aspect ratio of the display apparatus.

For example, suppose that the video signals "I" and "II" are respectively inputted from the different video signal sources (refer to FIG. 8), the display apparatus can display a picture "A" due to the video signal "I" and a picture "a" due to the video signal "II" normally before being pivoted. However, in the state that the display apparatus is pivoted by an angle of 90 degrees, the entire picture comprising the pictures "A" and "a" is also rotated and resized in correspondence to the aspect ratio of the display apparatus. As a result, the rotated picture is vertically elongated as shown in FIG. 8, so that the rotated picture becomes distorted.

Further, when a user pivots the display apparatus by an angle of 90 degrees, it is impossible to change a split screen ratio of the pictures "A" and "a".

To solve these problems, the video signal source itself can be manufactured to directly output a video signal for the rotated picture. However, it is actually difficult to apply this method to all video signal sources such as the DVD player, the VTR, or the like.

SUMMARY OF THE INVENTION

Accordingly, the present general inventive concept provides a display apparatus and a control method thereof, in which video signals are individually rotated, thereby providing an optimum picture to a user and realizing various screen displays.

The present general inventive concept also provides a display apparatus and a control method thereof, in which a predetermined region of a picture based on a video signal is rotated, thereby realizing various screen displays.

Additional aspects and advantages of the present general inventive concept will be set forth in part in the description which follows and, in part, will be obvious from the description, or may be learned by practice of the general inventive concept.

The foregoing and/or other aspects and advantages of the present general inventive concept are achieved by providing a display apparatus receiving a plurality of video signals from a plurality of different video signal sources, the display apparatus comprising: a user selection part to select at least one of the plurality of video signals and to select rotation of the video signal; and a controller controlling the video signal selected through the user selection part to be rotated and displayed.

The display apparatus may further comprise a rotation angle setting part to set a rotation angle of the video signal selected through the user selection part, wherein the controller controls the video signal selected through the user selection part to be rotated by the rotation angle set through the rotation angle setting part.

According to an embodiment of the present general inventive concept, the display apparatus further comprising a size setting part to set the size of the video signal selected through the user selection part, and a scaling part to scale each video signal, wherein the controller controls the scaling part to scale the video signal selected through the user selection part to have the size set through the size setting part.

According to an embodiment of the present general inventive concept, the display apparatus further comprising an input capturer capturing at least one of the plurality of video signals and transmitting the captured video signal to the scaling part, wherein the controller controls the input capturer to capture the video signal selected through the user selection part.

The foregoing and/or other aspects of the present general inventive concept are also achieved by providing a display apparatus receiving an external video signal, comprising: a user selection part to select a predetermined region of the video signal and to select rotation of the region; and a controller controlling the region selected through the user selection part to be rotated and displayed.

According to an embodiment of the present general inventive concept, the display apparatus further comprising a rotation angle setting part to set a rotation angle of the region selected through the user selection part, wherein the controller controls the region selected through the user selection part to be rotated by the rotation angle set through the rotation angle setting part.

According to an embodiment of the present general inventive concept, the display apparatus further comprising a size setting part to set the size of the region selected through the user selection part, wherein the controller controls the region selected through the user selection part to have the size set through the size setting part.

The foregoing and/or other aspects and advantages of the present general inventive concept are also achieved by providing a method of controlling a display apparatus receiving a plurality of video signals from a plurality of different video signal sources, the method comprising: selecting at least one of the plurality of video signals and selecting rotation of the video signal; and controlling the selected video signal to be rotated and displayed.

The method may further comprise setting a rotation angle of the video signal selected in the selecting the rotation of the video signal, wherein the controlling the selected video signal to be rotated and displayed comprises rotating the selected video signal by the set rotation angle.

The method may further comprise setting the size of the video signal selected in the selecting the rotation of the video signal, wherein the controlling the selected video signal to be rotated and displayed comprises scaling the selected video signal to have the set size.

The foregoing and/or other aspects and advantages of the present general inventive concept are also achieved by providing a method of controlling a display apparatus receiving an external video signal, the method comprising: selecting a predetermined region of the video signal and selecting rotation of the selected region; and controlling the selected video signal to be rotated and displayed.

The method may further comprise setting a rotation angle or the size of the region selected in the selecting the rotation of the selected region, wherein the controlling the selected video signal to be rotated and displayed comprises rotating the selected region by the set rotation angle or scaling the selected region to have the set size.

BRIEF DESCRIPTION OF THE DRAWINGS

These and/or other aspects and advantages of the present general inventive concept will become apparent and more readily appreciated from the following description of the embodiments, taken in conjunction with the accompanying drawings of which:

FIG. 1 is a control block diagram of a display apparatus according to an embodiment of the present general inventive concept;

FIG. 4 illustrates a setting window for a user selection part, a rotation angle setting part, and a size setting part;

DETAILED DESCRIPTION OF THE PREFERRED EMBODIMENTS

Figure 2A:
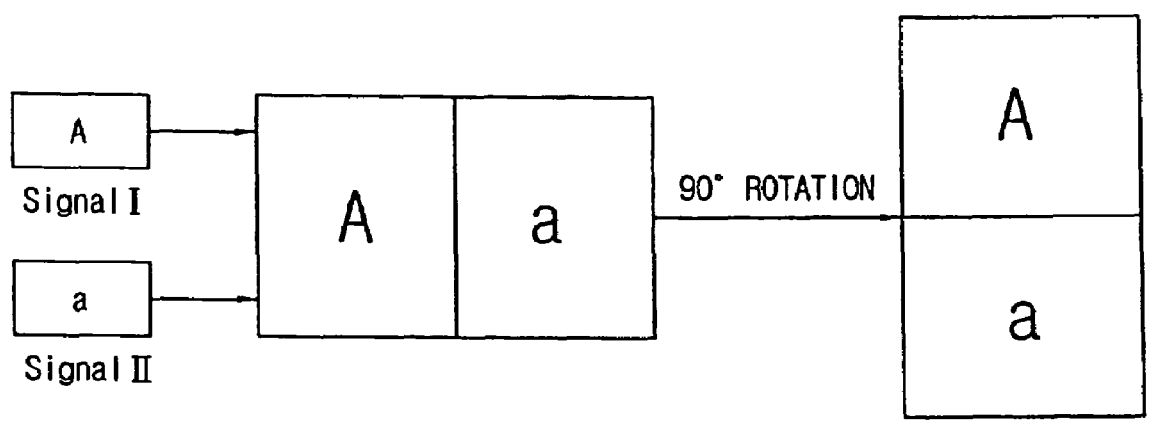
FIGS. 2A through 3B illustrate each rotated video signal displayed on a display part of FIG. 1.

Reference will now be made in detail to the embodiments of the present general inventive concept, examples of which are illustrated in the accompanying drawings, wherein like reference numerals refer to like elements throughout. The embodiments are described below in order to explain the present general inventive concept while referring to the figures.

FIG. 1 is a control block diagram of a display apparatus according to an embodiment of the present general inventive concept. As shown therein, the display apparatus according to FIG. 1 comprises an input capturer 40 to capture at least one of a plurality of input video signals input from a plurality of video signal sources; a scaling part 42 to scale up/down vertical and horizontal sizes of the video signals captured by the input capturer 40 on the basis of aspect ratios; a frame buffer mapping controller 46 which restructures information about an entire picture by calculating a position of a pixel changed when the video signals processed in the scaling part 42 are respectively rotated by predetermined angles, and calculating an allocation position of a frame buffer 44 corresponding to the position of the pixel, and stores the restructured entire picture information in the frame buffer 44 or fetches the picture information from the frame buffer 44; the frame buffer 44 to store the restructured entire picture information; and an output format controller 48 controlling timing to drive a display part 50.

Further, the display apparatus according to the embodiment of FIG. 1 comprises a user selection part 56 allowing a user to select at least one of the plurality of video signals and to select the video signal to be rotated or not; a rotation angle setting part 58 to set a rotation angle of the video signal selected through the user selection part 56; a size setting part 60 to set the size of each of the video signals selected through the user selection part 56; and a microcomputer 52 functioning as a controller to generally control the display apparatus.

The input capturer 40 is controlled by the microcomputer 52 and transmits at least one of the plurality of input video signals to the scaling part 42.

The scaling part 42 is controlled by the microcomputer 52, scales the vertical and horizontal sizes of each video signal transmitted from the input capturer 40 to have a predetermined size a user wants on the display part 50 or to have a preset size adapted to the display part 50 of the pivoted display apparatus, and transmits each scaled video signal to the frame buffer mapping controller 46.

At this time, the microcomputer 52 calculates a scaling factor and transmits the scaling factor to scalers of the scaling part 42 in order to make each of the video signals have the size a user wants or the preset size when the display apparatus is pivoted.

In this embodiment, the number of the scalers is equal to the number of the input video signals. For example, the number is N. However, the number of the scalers may be equal to the number of the input video signals or less than the number of input video signals. In this case, there can be provided a scaler which can process a plurality of different input video signals.

The frame buffer mapping controller 46 calculates the position of the pixel rearranged when the video signal is rotated at a predetermined angle, and calculates the allocation position of the frame buffer 44 corresponding to the position of the pixel, thereby storing the information about the rearranged pixel in the frame buffer 44. Further, the frame buffer mapping controller 46 fetches the information about the rearranged pixel from the frame buffer 44 and transmits it to the output format controller 48 in response to a request of the output format controller 48.

The output format controller 48 reproduces horizontal/vertical synchronous signals, a timing signal, a data signal, etc., so as to convert the video signal to have a signal format required by the display apparatus and to display the video signal on the display part 50.

The microcomputer 52 controls the input capturer 40 to capture the video signal to be displayed when the video signal to be displayed is selected through the user selection part 56. Further, the microcomputer 52 controls the scaling part 42 to scale the size of each video signal to have the set size when the size of the video signal is set by the size setting part 60. Also, the microcomputer 52 transmits information about the set rotation angle to the frame buffer mapping controller 46 when the rotation angle of each video signal is set by the rotation angle setting part 58, and controls the frame buffer mapping controller 46 to rotate each video signal transmitted from the scaling part 42 by the set rotation angle.

In the foregoing description, the video signal to be rotated is displayed on the basis of the size set by the size setting part 60, but not limited to and may be displayed on the basis of the size corresponding to the previously stored scaling factor according to the pivoted state of the display apparatus.

With this configuration, FIGS. 2A through 3B illustrate each rotated video signal displayed on a screen.

Figure 2B:
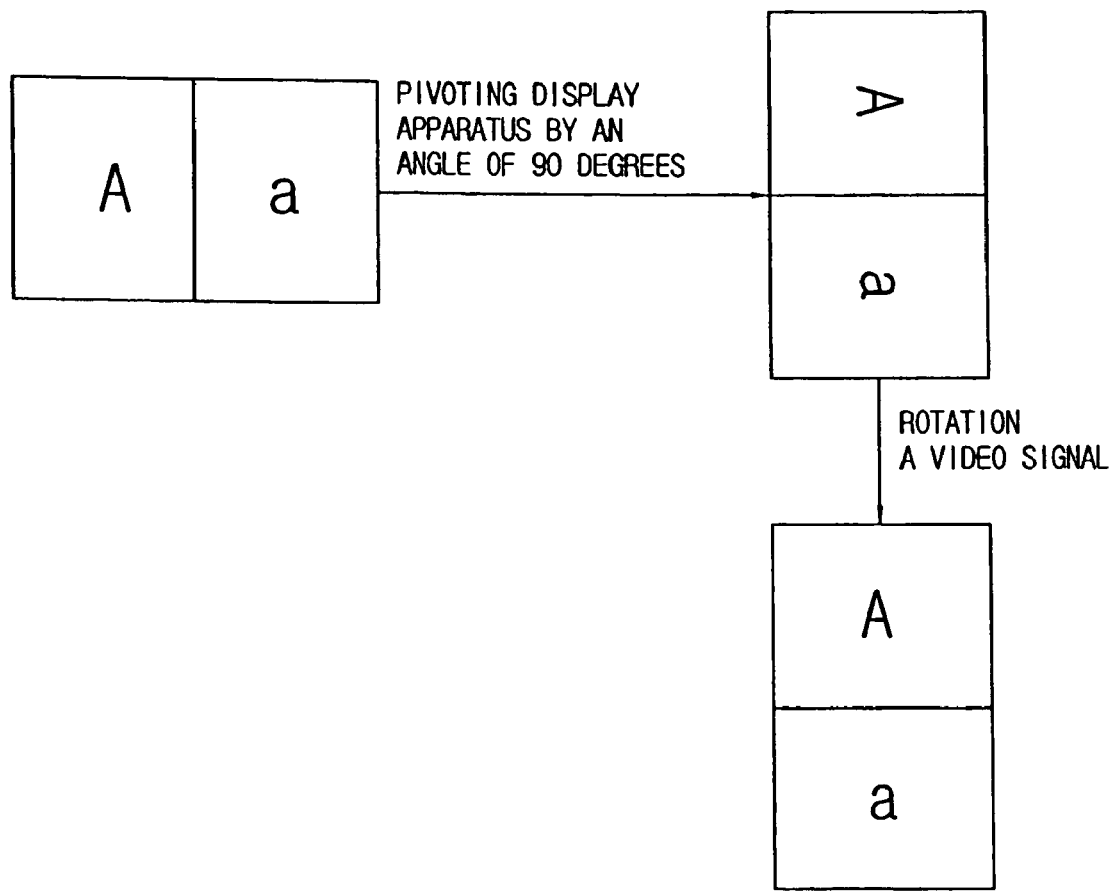

As shown in FIGS. 2A and 2B, suppose that a video signal I for a picture "A" and a video signal II for a picture "a" are inputted from different video signal sources, and the screen is vertically split. Hereinbelow, the video signals I and II will be processed on the assumption that the display apparatus is clockwise pivoted by an angle of 90 degrees, and the picture "A" and the picture "a" are displayed on the vertically split screens. Referring to FIG. 2B, in the display apparatus clockwise pivoted by an angle of 90 degrees, the user selection part 56 allows a user to select the pictures "A" and "a" to be rotated or not. For example, when a user selects each of the pictures "A" and "a" to be counterclockwise rotated by an angle of 90 degrees (or to be clockwise rotated by an angle of 270 degrees), the pictures "A" and "a" are displayed on the horizontally split screens, respectively.

At this time, a user can rotate each of the pictures "A" and "a" by a desired angle even though the display apparatus is not pivoted.

Figure 3A:
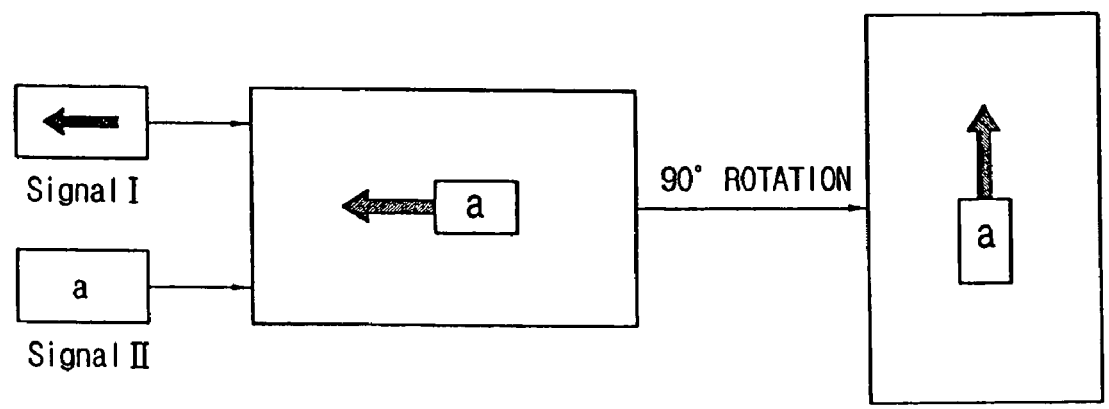
Figure 3B:
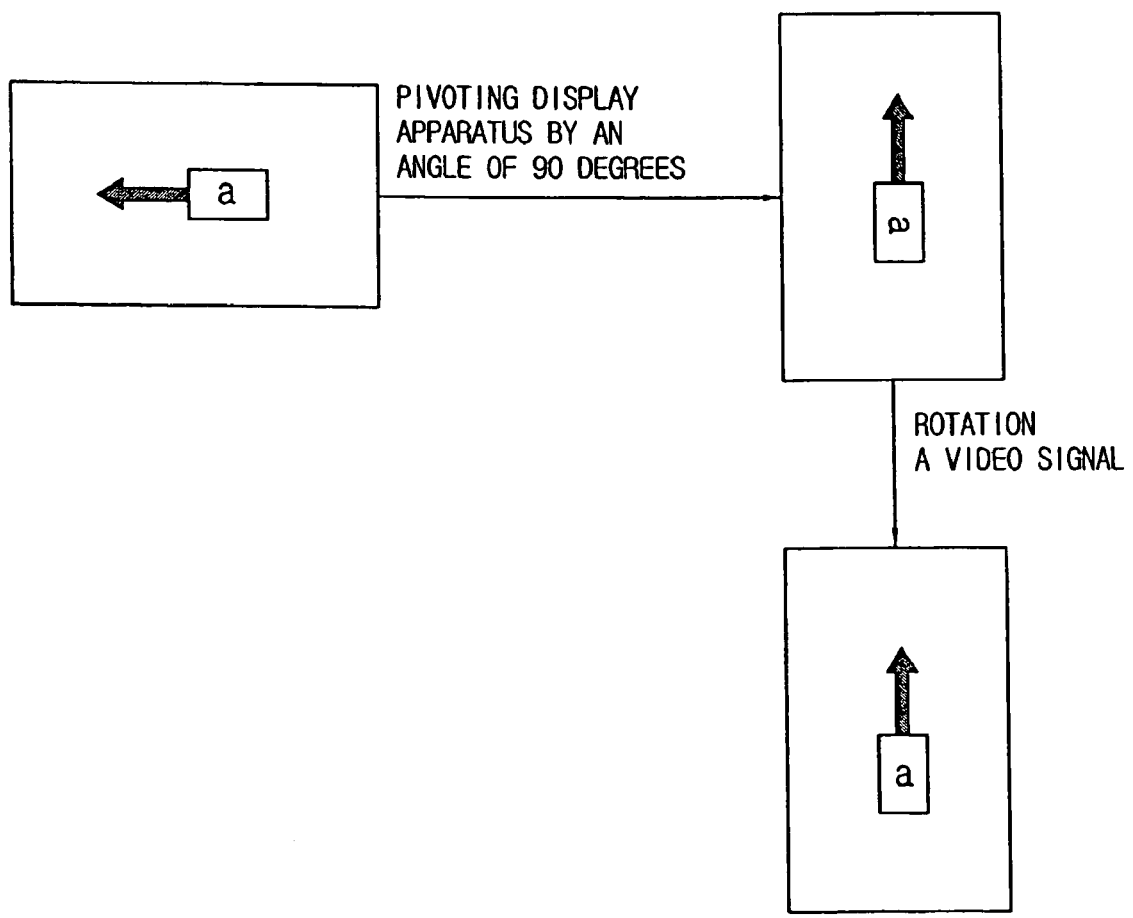

Further, as shown in FIGS. 3A and 3B, suppose that a video signal I for a picture "←" and a video signal II for a picture "a" are inputted from different video signal sources, respectively. Hereinbelow, the video signals I and II will be processed on the assumption that the display apparatus is clockwise pivoted by an angle of 90 degrees, and a user wants to change the picture "←" and the picture "a" into the picture "↑" and the picture "a". Referring to FIG. 3B, in the display apparatus clockwise pivoted by an angle of 90 degrees, the user selection part 56 allows a user to select each of the pictures "←" and "a" to be rotated or not to be rotated. In the case of FIG. 3B, there is no need to rotate the picture "←", so that only the picture "a" is selected to be counterclockwise rotated by an angle of 90 degrees (or to be clockwise rotated by an angle of 270 degrees), thereby displaying the pictures "↑" and "a" as a user wants.

FIG. 4 illustrates a setting window for the user setting part 56, the rotation angle setting part 58, and the size setting part 60. In FIG. 4, the setting window includes predetermined menus, thereby allowing a user to set the rotation, the rotation angle, and the size of each video signal transmitted from different video signal sources. Here, the rotation itself and the rotation angle can be directly inputted by a user, or can be set in correspondence to preset values (e.g., rotation: Yes/No, angle: +90°, +180°, +270°, −90°, etc.) each time a user pushes a predetermined key. Further, the size can be set to be increased or decreased by dragging a mouse, selecting arrow keys, a "+" key, a "−" key, a PgUP key, a PgDn key, or the like.

Alternately, the setting window for the user setting part, the rotation angle setting part, and the size setting part is not limited thereto, and may be set by a button provided in a remote controller, a button provided in the display apparatus, etc.

Figure 5:
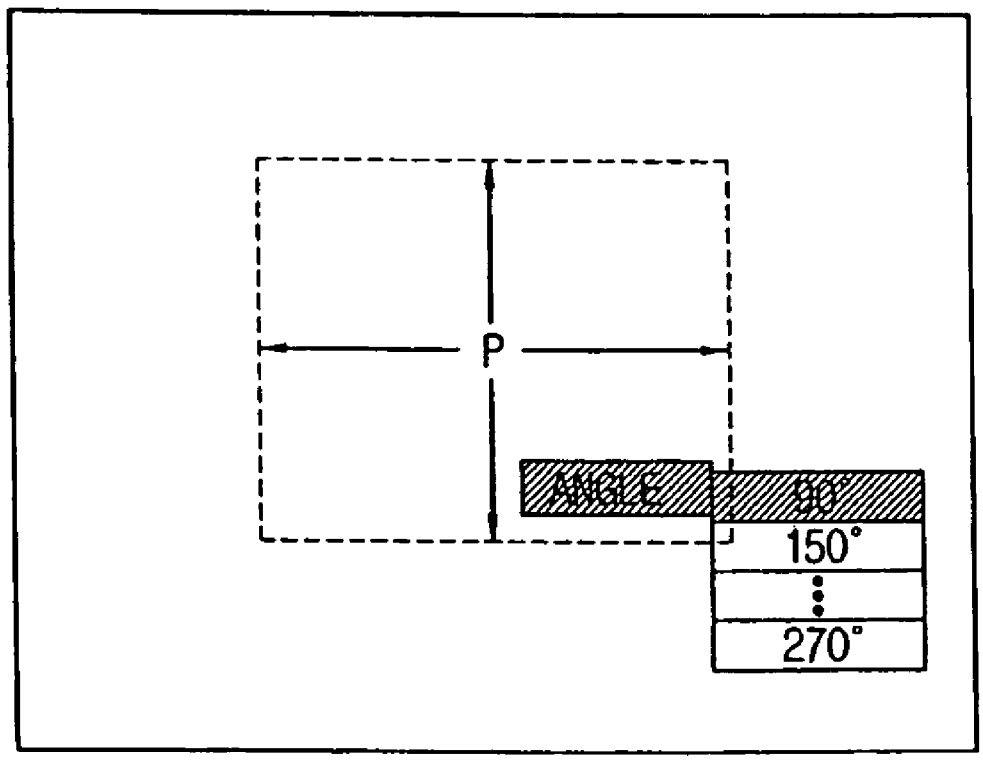
FIG. 5 illustrates a screen to rotate a predetermined region in the display apparatus of FIG. 1, according to an embodiment of the present general inventive concept.

In the foregoing embodiment, a picture based on at least one of the plurality of video signals is entirely rotated. However, as shown in FIG. 5, only a predetermined region of a picture based on one video signal may be selected, and the selected region can be rotated. In this case, the predetermined region can be selected by dragging the mouse, and the rotation angle can be set through a popup menu window. Further, the size of the selected region can be selected.

Figure 6:
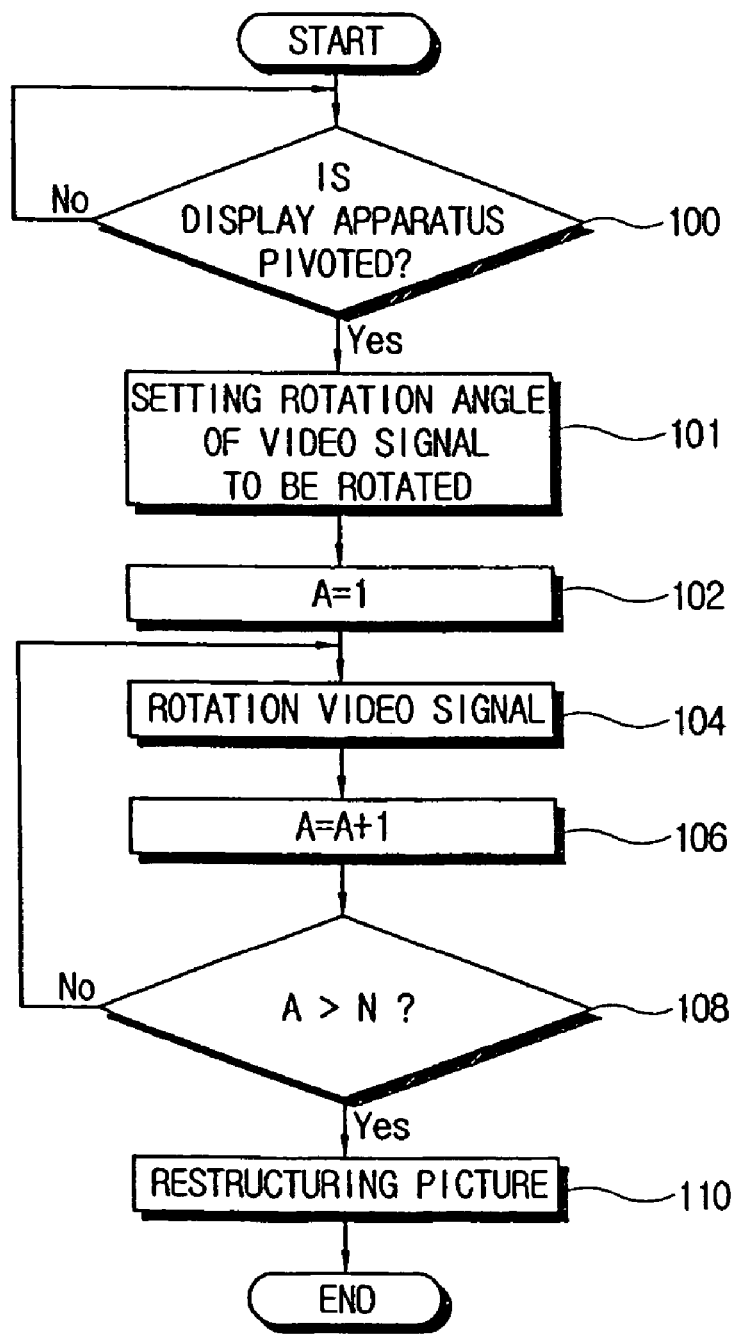
FIG. 6 is a control flowchart of a display apparatus according to FIG. 1.
Figure 7:
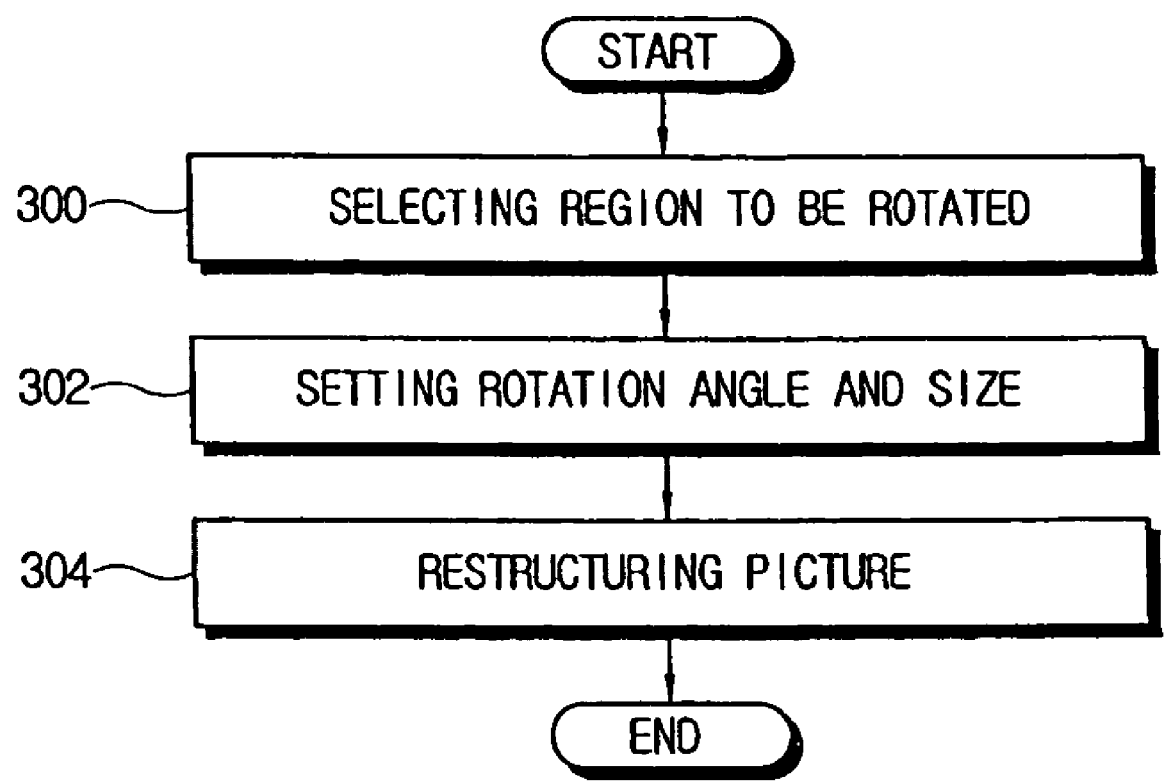
FIG. 7 is a control flowchart of a display apparatus according to another embodiment of the present general inventive concept.
Figure 8:
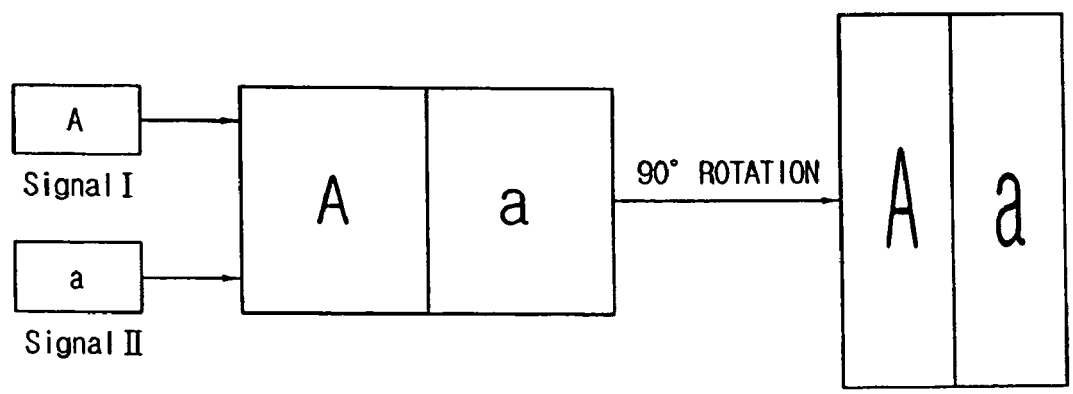
FIG. 8 illustrates a rotated state of a video signal when a conventional display apparatus is pivoted.

With this configuration, FIGS. 6 and 7 illustrate control flowcharts of the display apparatus according to the embodiments of the present invention.

As shown in FIG. 6, at operation 100, a user makes the display apparatus pivot. At operation 101, a user selects the video signals transmitted from different video signal sources to be rotated, and then sets the rotation angle of each video signal. Here, let's assume a user selects the video signals of 1~N and sets the rotation angles of the respective video signals. At operations 102, 104, 106, 108, the video signals of 1~N are rotated by the respective set rotation angles. Then, at operation 110, pictures are restructured. Meanwhile, a user can set the size of each video signal, which is not illustrated in FIG. 6.

As shown in FIG. 7, at operation 300, a region of a picture based on the video signal to be rotated is selected by a user. At operation 302, the rotation angle and the size of the selected region are set. At operation 304, the display apparatus restructures the selected region to have the set rotation angle and the set size.

In the foregoing embodiment, the scaling factor of 1 is regarded as no scaler, and thus the input video signal can be adjusted in only the rotation angle and displayed on the display part 50.

As described above, the present general inventive concept provides a display apparatus and a control method thereof, in which video signals are individually rotated, thereby providing an optimum picture to a user and realizing various screen displays.

Further, the present general inventive concept provides a display apparatus and a control method thereof, in which a predetermined region of a picture based on a video signal is rotated, thereby realizing various screen displays.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A display apparatus to receive a plurality of video signals from a plurality of different video signal sources, the display apparatus comprising:
    a user selection part to select at least one of the plurality of video signals and to select rotation of the video signal;
    a controller to control the video signal selected through the user selection part to be rotated and displayed;
    a size setting part to set the size of the video signal selected through the user selection part, and a scaling part to scale each video signal; and
    an input capturer to capture at least one of the plurality of video signals and to transmit the captured video signal to the scaling part,
    wherein the controller controls the to scale the video selected through the user selection part to have the size set through the size setting part and controls the input capturer to capture the video signal selected through the user selection part.

2. The display apparatus according to claim 1, further comprising a rotation angle setting part to set a rotation angle of the video signal selected through the user selection part, wherein
the controller controls the video signal selected through the user selection part to be rotated by the rotation angle set through the rotation angle setting part.

3. A display apparatus to receive an external video signal, comprising:
a user selection part to select a predetermined region of the video signal and to select rotation of the region;
a controller to control the region selected through the user selection part to be rotated and displayed;
a size setting part to set the size of the region selected through the user selection part, and a scaling part to scale the predetermined region; and
an input capturer to capture the region selected and to transmit the captured region to the scaling part,
wherein the controller controls the scaling part to scale selected through the user selection part to have the size set the size setting art and controls the input capturer to capture the region selected through the user selection part.

4. The display apparatus according to claim 3, further comprising a rotation angle setting part to set a rotation angle of the region selected through the user selection part, wherein
the controller controls the region selected through the user selection part to be rotated by the rotation angle set through the rotation angle setting part.

5. A method of controlling a display apparatus receiving a plurality of video signals from a plurality of different video signal sources, the method comprising:
selecting at least one of the plurality of video signals and selecting rotation of the video signal;
controlling the selected video signal to be rotated and displayed;
setting the size of the video signal net selected;
scaling each video signals; and
controlling the scaling of the video signal selected to have the set size and controlling the capturing of the video signal selected.

6. The method according to claim 5, further comprising setting a rotation angle of the video signal selected in the selecting the rotation of the video signal, wherein
the controlling the selected video signal to be rotated and displayed comprises rotating the selected video signal by the set rotation angle.

7. A method of controlling a display apparatus receiving an external video signal, the method comprising:
selecting a predetermined region of the video signal and selecting rotation of the selected region;
controlling the selected video signal to be rotated and displayed;
setting the size of the region selected;
scaling the predetermined region;
capturing the region selected and to transmit the captured region to the scaling part; and
controlling the scaling of the region selected to have the size set and the capturing of the region selected.

8. The method according to claim 7, further comprising setting a rotation angle or size of the region selected in the selecting the rotation of the selected region, wherein
the controlling the selected video signal to be rotated and displayed comprising routing the selected region by the set rotation angle or scaling the selected region to have the set size.

9. A display apparatus to receive a plurality of video signal, comprising:
an input capturer to capture at least one of the plurality of input video signals;
a scaling part to scale up/down vertical and horizontal sizes of the video signals captured by the input capturer on the basis of aspect ratios;
a frame buffer mapping controller to restructure information about an entire picture by calculating a position of a pixel changed when the video signals processed in the scaling part are respectively rotated by predetermined angles and calculating an allocation position of a frame buffer corresponding to the position of the pixel, and to store the restructured entire picture information in the frame buffer or fetches the picture information from the frame buffer;
a frame buffer to store the restructured entire picture information;
an output format controller to control timing to drive a display part to display the restructured entire picture information;
a user selection part to select at least one of the plurality of video signals or a predetermined region of one of the video signals and to select rotation of the selection; and
a controller to control the selection by the user selection part to be rotated and displayed.

10. The display apparatus according to claim 9, further comprising a rotation angle setting part to set a rotation angle of the selection selected through the user selection part, and
the controller controls the selection to be rotated by the rotation angle set through the rotation angle setting part.

11. The display apparatus according to claim 10, further comprising a size setting part to set the size of the selection selected by the user selection part, and the controller controls the selection to have the size set through the size setting part.

12. A display apparatus receiving a plurality of video signals from a plurality of different video signal sources, the display apparatus comprising:
a user adjustment part to select at least one of the plurality of video signal or a predetermined region of one of the plurality of video signals and to select adjustment of the at least one video signal or the predetermined region of the one of the video signals; and
a controller to control the selection selected through the user adjustment part to be adjusted and displayed,
wherein the user adjustment part comprises a user selection part to select rotation of the at least one video signal or the predetermined region of the video signal and a rotation angle setting part to set a rotation angle of the at least one video sig or the rotation of the video signal, the controller controls the selection selected through the user adjustment part to be rotated by the rotation angle set through the rotation angle setting part.

13. The display apparatus according to claim 12 wherein the user adjustment part further comprises a size setting part to set a size of the at least one video signal or the predetermined region of the video signal, and a scaling part to scale each video signal, the controller controls the scaling part to scale the selection selected through the user adjustment part to have the size set through the size setting part.

* * * * *